United States Patent [19]
Szeverenyi

[11] 3,772,673
[45] Nov. 13, 1973

[54] TEMPERATURE COMPENSATED FLUID LEVEL SENSOR

[75] Inventor: Nikolaus A. Szeverenyi, Warren, Pa.

[73] Assignee: GTE Sylvania Incorporated, Seneca Falls, N.Y.

[22] Filed: Mar. 20, 1972

[21] Appl. No.: 236,148

[52] U.S. Cl. ............................ 340/244 R, 337/380
[51] Int. Cl. ........................................... G08b 21/00
[58] Field of Search ............... 340/244 R; 337/380

[56] References Cited
UNITED STATES PATENTS
2,304,211   12/1942   Sparrow .......................... 340/244 R
3,171,934   3/1965    Brennan ............................. 337/380

*Primary Examiner*—Thomas B. Habecker
*Attorney*—Norman J. O'Malley et al.

[57] ABSTRACT

An apparatus for detecting the presence or absence of fluid at a predetermined level within a container. The apparatus comprises an electrical circuit and a sensor device electrically joined to the circuit and positioned within a wall of the container. The device comprises a housing of conductive material, a conducting member within the housing and insulated therefrom, a tip member of conductive material affixed to the housing, a resistive element having first and second opposing ends, the first end is electrically connected to the conducting member and the second end electrically connected to the tip member, and first and second oppositely aligned similar bimetallic members affixed respectively to the first and second opposing ends of the resistive element and adapted for engaging only when the temperature difference between the first and second opposing ends of the element exceeds a predetermined level.

19 Claims, 5 Drawing Figures

TEMPERATURE COMPENSATED FLUID LEVEL SENSOR

BACKGROUND OF THE INVENTION

This invention relates to fluid sensing apparatus and more particularly to an apparatus for providing a signal indication when the fluid in a container is below a predetermined level.

Previous known methods for detecting the level of fluid whthin a container have varied from mechanically operated floats to probing devices requiring elaborate electronic circuitry. A particular shortcoming to many devices of the former variety has been the inability to compensate for a change in temperature of the fluid being measured. Additionally, those devices able to compensate for fluid temperature changes have, as mentioned, required extensive electronic circuitry which in turn has added appreciably to the complexity of operation of the device as well as to the costs for manufacturing such items.

It is believed, therefore, that a device for detecting the presence or absence of fluid at a predetermined level within a container which would compensate for varying temperatures of the fluid being measured as well as be relatively simple in operation and inexpensive to manufacture would constitute an advancement in the art.

OBJECTS AND SUMMARY OF THE INVENTION

It is therefore a primary object of this invention to provide a fluid level sensing apparatus which includes a means for compensating for possible varying temperatures of the fluid to be detected.

It is a further object of this invention to provide a sensing apparatus which operates in a relatively simple manner and is relatively inexpensive to manufacture.

In accordance with one aspect of this invention there is provided an apparatus for detecting the presence or absence of fluid at a predetermined level within a container. This apparatus comprises an electrical circuit having a potential source, a switching means for opening and closing the circuit, and a current indicating means for indicating when the current in the circuit exceeds an established level. Additionally, the apparatus comprises a sensor device electrically connected to the circuit and having a housing, an electrically conducting member positioned within the housing and insulated therefrom, a tip member bonded to the housing, a resistive element having first and second opposing ends of conductive material, the first end is electrically connected to the conducting member and the second end electrically connected to the tip member, and first and second oppositely aligned bimetallic members possessing a substantially similar degree of thermal deflection and affixed respectively to the first and second opposing end of the resistive element. These bimetallic members are adapted for engaging when the temperature difference between the opposing ends of the resistive element and hence the temperature difference between the bimetallic members exceeds a predetermined level.

DETAILED DESCRIPTION OF THE PREFERRED EMBODIMENTS

For a better understanding of the present invention, together with other and further objects, advantages and capabilities thereof, reference is made to the following disclosure and appended claims in connection with the above description of some of the aspects of the invention.

Figure 1:
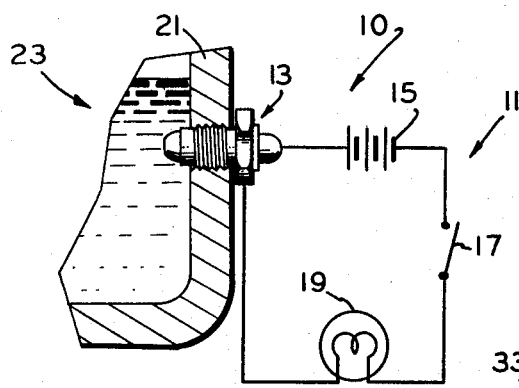
FIG. 1 is a side elevational view of one embodiment of the present invention.

In FIG. 1 one embodiment of a liquid level detecting apparatus 10 in accordance with the invention is illustrated and shown to comprise an electrical circuit 11 and a sensor device 13. Circuit 11 comprises a potential source illustrated as battery 15, a switching means 17 for opening and closing circuit 11, and a current indicating means, illustrated as bulb 19. Sensor device 13 is electronically connected to circuit 11 and is shown to be positioned within wall 21 of a fluid holding container 23. Although the particular method illustrated for positioning sensor 13 is to place it in the side of container 23, sensor 13 may be placed in either the bottom or top of the container depending on the level of fluid desired or the configuration of the container. Furthermore, although the method shown for retaining sensor 13 in wall 21 is by screw threads (the sensor being provided with external screw threads to mate with corresponding threads in wall 21), other methods for retention are possible, an example being either welding or soldering. The method illustrated is preferred, however, because it provides relative ease of removal of sensor 13 in the event of damage to the sensor or container.

Figure 2:
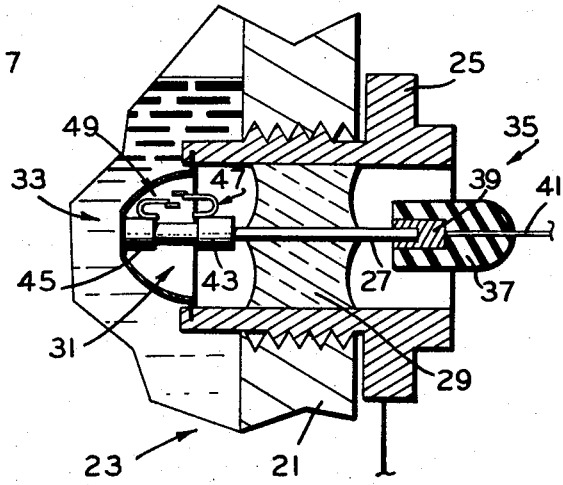
FIG. 2 is an enlarged view of the sensor device of FIG. 1.

In FIG. 2 can be seen a more detailed view of sensor 13, which is shown to comprise a housing 25 of electrically conductive material, an electrical conducting member, illustrated as center post 27, which is positioned within housing 25 and insulated therefrom by insulating material 29, a resistive element 31, and a tip member 33 of electrically conductive material. Center post 27 is electrically connected to circuit 11 via plug 35 illustrated as a body of insulative material 37 about a metallic socket 39 which in turn is connected to conducting wire 41. Plug 35 is but one means possible for providing this interconnection and is not meant as the sole method to which the invention is limited. Additional connecting means, including an alligator clip or even a single wire soldered to post 27 are possible. In the event that the atmosphere surrounding container 23 is not favorable for exposed electrical connections, a plug having an insulating cap to encompass the external portions of either post 27 or housing 25 is preferred.

Tip member 33, sealed in housing 25 to thereby encapsulate resistive element 31 therein, is adapted for being subjected to the fluid within container 23. A preferred material for tip member 33 is sold under the trade name "Rodar" and manufactured by the W. B. Driver Company of Newark, N.J., a subsidiary of the assignee of the proposed present invention. "Rodar," consisting essentially of about 29 percent by weight nickel, 17 percent by weight cobalt, and the remainder iron, is a suitable electrical conductor and possesses the additional property of relatively low thermal conductivity. This additional property, as will be further explained, is highly desirable to enhance the functioning characteristics of sensor 13. Resistive element 31, comprising first and second opposing ends 43 and 45 respectively, is joined at first opposing end 43 to center post 27 and at second opposing end 45 to tip member 33. First and second opposing ends 43 and 45 are of electrically conductive material and have first and second bimetallic members 47 and 49 affixed respectively thereto. The conductive material preferred for opposing ends 43 and 45 is a nickel-silver metallic alloy, although any of the well known metals or metal alloys having good electrical conducting properties can be utilized.

Bimetallic members 47 and 49, also possessing similar electrical conducting properties, are illustrated as being oppositely aligned and in a non-engaging relationship when the fluid level in container 23 is above tip member 33. As will be explained, these bimetallic members are adapted for engaging when the fluid level drops below the tip member. Electrical connection between circuit 11 and housing 25 is accomplished simply by affixing a wire from circuit 11 to any external portion of the housing, using any of the conventional methods, for example, welding. In the event that container 23 is of metallic nature or any material having good electrical conducting properties, circuit 11 may be connected thereto at any suitable location.

Figure 3:
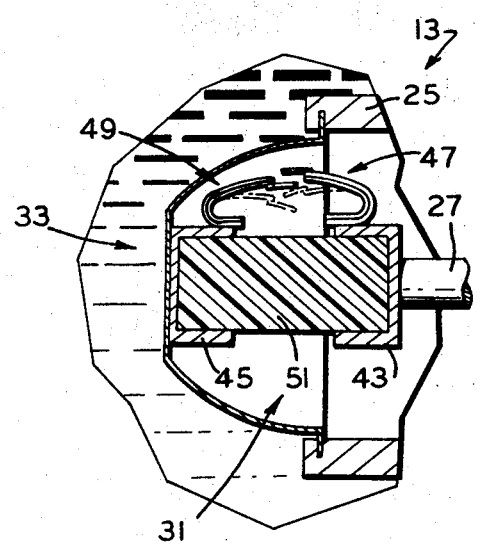
FIGS. 3 and 4 are enlarged views of various phases of operation of the sensor of FIG. 2.
Figure 4:
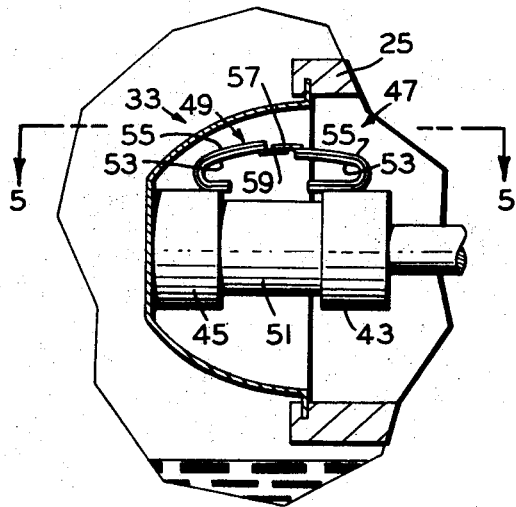

To explain the operation of apparatus 10, as shown in FIG. 1, particular reference is also made to items illustrated in detail in FIGS. 3 and 4. In FIG. 3, tip member 33 is shown as being subjected to the fluid within container 23. As previously explained, bimetallic members 47 and 49 are in a nonengaging relationship when these members are at the same temperature. These members are comprised of a suitable bimetal having similar electrical conductive properties as well as similar degrees of thermal deflection thereby permitting each member to deflect substantially equal, as the environmental temperature alters. A unique feature of sensor device 13 is its ability to operate in fluids having a wide variety of temperatures, due to the positioning of bimetallic members 47 and 49. When the fluid surrounding tip member 33 is excessively warm, expandable members 47 and 49 deflect equally to the position illustrated in FIG. 3. In the event that the fluid is cooled, these members deflect accordingly in the opposite direction (shown in phantom). It is remembered, however, that members 47 and 49 maintain a non-engaging relationship throughout these varying stages of deflection, provided tip member 33 is subjected to the fluid within the container thereby keeping the temperature of all elements within the sensor substantially equal.

To operate apparatus 10, switching means 17 is closed, thereby providing electrical current to circuit 11 and to sensor 13. A typical direction of current flow from battery 15 is through center post 27, first opposing end 43 of resistive element 31, resistive material 51 of element 31, shown in FIG. 3, second opposing end 45 of element 31, tip member 33, housing 25 and thereafter back to circuit 11 where it passes through bulb 19. Because this current must pass through resistive material 51, which may be any material typically found in electrical resistors, it is not sufficient to activate bulb 19. Assuring that bulb 19 will not light under these conditions is easily accomplished by proper selection of corresponding elements in the sensor and circuit. One example of a workable circuit-sensor arrangement is to use a 12 volt battery connected to a bulb having a resistance of approximately 1 ohm. When using this combination, the desired resistance of the resistive material of element 31 is approximately 240 ohms. The resistance of other elements in sensor 13, particularly housing 25, opposing ends 43 and 45, center post 27, tip member 33, and bimetallic members 47 and 49 is minimal and can be considered effectively as zero.

The current through resistive material 51 causes this material to become warm as is the case in almost all electrical resistors. This heat then dissipates out through opposing ends 43 and 45 of element 31. The heat dissipated through end 43 is heat sinked further through center post 27, insulative material 29, housing 25, and eventually into container wall 21. The heat dissipated through end 45 is heat sinked primarily through tip member 33 and then into the fluid within container 23. Provided tip member 33 remains subjected to the fluid, the heat created in element 31 is dissipated at a substantially equal rate through the above-described channels thereby maintaining the temperature of all members within sensor 13 approximately the same. However, when the fluid level drops below tip member 33, as illustrated in FIG. 4, an imbalance to this rate of dissipation is created. This unequal rate occurs primarily because the fluid, which previously served as a heat sink for the heat generated in end 45 is now absent. However, to further assure this imbalance during a low fluid level, it is preferred that the overall volume of center post 27 be substantially greater than the corresponding volume of tip member 33. It is also additionally preferred that the coefficient of thermal conductivity of center post 27 be larger than that of tip member 33, but this is not necessarily required provided a substantial difference of volumes between these two members exists. In the particular embodiment, the tip member comprised of Rodar has a coefficient of thermal conductivity of approximately 12.0 BTU/(hr.) (sq. ft.) (°F per ft.) while that of center post 27 which is preferably of steel or similar composition, ranges between 25 and 40 BTU/(hr.) (sq. ft.) (°F per ft.).

As described, the absence of fluid now causes end 45 to become substantially warmer than end 43. This temperature difference in turn causes bimetallic member 49 to become warmer than bimetallic member 47 which results in an unequal amount of deflection by metallic member 49 to therefore upwardly deflect and engage member 47. When these two members engage (as shown in FIG. 4) electrical current from center post 27 through first opposing end 43 is permitted to by-pass resistive material 51 and pass directly to second opposing end 45 via the engaged bimetallic members 47 and 49 because the combined resistance of members 47 and 49 is effectively zero, as previously described. The current then returns to bulb 19 through tip member 33 and housing 25 where it now is at sufficient level to actuate the bulb. This in turn indicated to an operator that the fluid level of container 23 is below tip member 33.

The sensor device as illustrated is unique in another feature in that it provides a means whereby bulb 19 is sequentially actuated to more readily indicate to the operator the low fluid level. This sequential actuation is achieved when the electrical current by-passing resistive material 51 passes through engaged bimetallic members 47 and 49 for a sufficient period to allow material 51 to cool. This cooling lowers the temperature difference between opposing ends 43 and 45 to thereby reduce the corresponding temperatures in bimetallic members 47 and 49, causing them to open. The current thereafter must pass through resistive material 51 once again until this temperature difference is again attained, causing members 47 and 49 to once again engage. This cycle of temperature changes indirectly raises and lowers the level of current flow in sensor 13 and circuit 11 and therefore causes bulb 19 to be energized intermittently. If desired, however, a steady signal can be provided by use of an electrical or mechanical latching circuit or device which latches on to energize bulb 19 continuously after the first deflection of bimetallic member 47. Such latching circuits or devices can include an SCR, latching relay, or similar circuits and devices.

To adequately achieve the degree of deflection required in the operation of sensor 13, similar bimetals must be used for each of members 47 and 49. More specifically, a bimetal utilized successfully in sensor 13 is Chace 2,400 bimetal, manufactured by the W.M. Chace Company of Detroit, Michigan, a subsidiary of the previously mentioned W. B. Driver Company. Chace 2,400 bimetal has a high expanding side (illustrated as high expanding layer 53 in FIG. 4) consisting essentially of about 22 percent by weight nickel, 3 percent by weight chromium, with the remainder iron, and a low expanding side (illustrated as low expanding layer 55 in FIG. 4) consisting essentially of 36 to 42 percent nickel with the remainder iron. An additional newly available bimetal also found suitable for use in sensor 13 is one produced by the W.M. Chace Company having a high expanding side consisting essentially of 22 percent nickel, 3 percent chromium, with the balance iron, and a low expanding side consisting essentially 30 to 35 percent nickel with the remainder iron. The high expanding side of the bimetal has a first coefficient of thermal expansion of from 0° F to 150° F of at least 7.0 $\times$ $10^{-6}$ per °F and a second coefficient of thermal expansion lower than the first over a temperature range from 150° F to 600° F. The low expanding side of the bimetal has a first coefficient of expansion ranging from about $1.4 \times 10^{-6}$ per °F to about $6.0 \times 10^{-6}$ per °F over a temperature range of 0° F to 150° F and a second coefficient of expansion of at least $7.0 \times 10^{-6}$ per °F over a temperature range from about 400° F to 600° F. This particular bimetal reduces many of the stresses found in prior art bimetals and results in improved overall operating conditions, especially in the higher temperature ranges. Depending on the configuration used for each of the bimetallic members, as well as the initial spacing between these members and the temperature difference required to cause their engaging, other bimetallic materials can be utilized successfully in this invention. For practical reasons however, bimetallic materials having operating characteristics substantially similar to those described are preferred.

Figure 5:
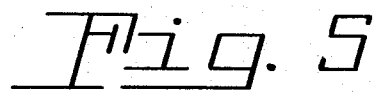
FIG. 5 is a plan view of the contacting ends of the expandable members of the sensor device as taken along the line 5—5 in FIG. 4.
Figure 5:
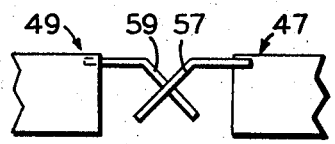

FIG. 5, taken along lines 5—5 in FIG. 4, more clearly illustrates another feature of sensor 13. Herein, a pair of angled contacting portions 57 and 59, preferably comprised of the better electrically conducting noble metals such as gold or silver, are shown attached to the ends of first and second bimetallic members 47 and 49 respectively. Angled as shown, contacting portions 57 and 59 provide a means whereby members 47 and 49 more readily engage and assure that electrical conduction between the members is enhanced. Other configurations of contacting portions 57 and 59 are possible, however, with those illustrated not meant to so restrict the proposed invention.

In addition to providing means whereby a visual indication is given when the fluid within container 23 is below a certain level, apparatus 10 can be modified to perform other functions by relatively simple alterations to circuit 11, such as energizing other circuits, or to operate other mechanisms such as audible signals, valving arrangements and the like. For example, circuit 11 can be modified to include a means for actuating a valving arrangement in a boiler to thereby either shut down a burner or to open a valve and permit more fluid to enter the container, depending on the pre-established fluid level setting.

Besides this particular application, apparatus 10 may be also used in other situations in which the fluids to be detected vary in temperature throughout their cycles of operation. Primary examples of such situations are found in the several containers of fluids utilized in the operation of automobiles. Sensor device 13 could easily be inserted into an automobile's brake fluid housing, radiator side wall, or the various housings for the transmission fluid, engine oil, power steering fluid, differential fluid, or even the windshield washer fluid, with the automobile's electrical circuitry readily able to substitute for circuit 11.

Thus, there has been provided an apparatus for detecting the presence or absence of fluid at a predetermined level within a container. Unique features of this apparatus, which include temperature compensation means for varying fluid temperatures and sequentially actuated current indicating means, have also been provided.

While there has been shown and described what are at present considered the preferred embodiments of the invention, it will be obvious to those skilled in the art that various changes and modifications may be made therein without departing from the scope of the invention as defined by the appended claims.

What is claimed is:

1. A sensor device comprising:
   a housing member defining a chamber;
   a tip member adapted for being exposed to a fluid, said tip member secured to said housing and forming a closure for said chamber and to prevent fluid entrance into said chamber;
   a heat conductive member within said chamber having a greater heat transfer capability than said tip member;
   heater means within said chamber having first and second spaced apart portions, said first portion in heat conductive relationship to said heat conductive member within said chamber, said second portion in heat conductive relationship to said tip member; and
   first and second heat responsive means having substantially similar characteristics of thermal deflection, said first and second heat responsive means in heat conductive relationship to said first and second spaced apart portions, respectively, and each having a free end adapted for mutual engagement only when the temperature difference between said first and second spaced apart portions of said heater means exceeds a predetermined level, said temperature difference resulting from a difference in rates of heat transfer of said heat conductive member and said tip member.

2. A sensor device according to claim 1 wherein said heater means within said chamber is an electrical resistive element.

3. A sensor device according to claim 1 wherein said heat conductive member within said chamber is electrically conductive.

4. A sensor device according to claim 1 wherein said tip member is electrically conductive.

5. A sensor device according to claim 1 wherein said heat responsive means are bimetallic members.

6. The sensor device according to claim 5 wherein each of said first and second bimetallic members has a contacting portion of noble metal affixed thereto.

7. A sensor device according to claim 5 wherein said bimetallic members have a high expanding side of an alloy of nickel-chromium-iron and a low expanding side of an alloy of nickel-iron and wherein the differential in coefficients of thermal expansion between said high and low expanding sides is appreciably greater at from about 0°F to about 150°F than from about 400°F to about 600°F.

8. A sensing apparatus comprising a sensor device comprising:
 a housing member defining a chamber;
 a tip member adapted for being exposed to a fluid, said tip member secured to said housing and forming a closure for said chamber and to prevent fluid entrance into said chamber;
 a heat conductive member within said chamber having a greater heat transfer capability than said tip member;
 heater means within said chamber having first and second spaced apart portions, said first portion in heat conductive relationship to said heat conductive member within said chamber, said second portion in heat conductive relationship to said tip member;
 first and second heat responsive means having substantially similar characteristics of thermal deflection, said first and second heat responsive means in heat conductive relationship to said first and second spaced apart portions, respectively, and each having a free end adapted for mutual engagement only when the temperature difference between said first and second spaced apart portions of said heater means exceeds a predetermined level, said temperature difference resulting from a difference in rates of heat transfer of said heat conductive member and said tip member; and
 means for sensing when said heat responsive means are engaged.

9. A sensing apparatus according to claim 10 wherein said means for sensing when said heat responsive means are engaged is an electrical circuit comprising a source of electrical potential operatively connected to said heat responsive means for opening and closing said circuit and a current indicating means adapted for indicating electrical current in said circuit when said heat responsive means are engaged.

10. A sensing apparatus according to claim 9 wherein the said sensor device said heat responsive means are bimetallic members.

11. A sensing apparatus according to claim 9 wherein in said sensor device, said heater means within said chamber is an electrical resistive element and is operatively connected to said source of electrical potential.

12. A sensing apparatus according to claim 11 wherein in said sensor device said heat conductive member is electrically conductive and is operatively connected to said electrical potential and to said electrical resistive element.

13. A sensing apparatus according to claim 12 wherein in said sensor device said tip member is electrically conductive and is operatively connected to said source of electrical potential and said electrical resistive element.

14. In combination, a container having walls adapted for containing a fluid therein, a sensor device at least partially positioned within a wall of said container, said device comprising:
 a housing member defining a chamber;
 a tip member adapted for being exposed to a fluid, said tip member secured to said housing and forming a closure for said chamber and to prevent fluid entrance into said chamber;
 a heat conductive member within said chamber having a greater heat transfer capability than said tip member;
 heater means within said chamber having first and second spaced apart portions, said first portion in heat conductive relationship to said heat conductive member within said chamber, said second portion in heat conductive relationship to said tip member;
 first and second heat responsive means having substantially similar characteristics of thermal deflection, said first and second heat responsive means in heat conductive relationship co said first and second spaced apart portions respectively, and each having a free end adapted for mutual engagement only when the temperature difference between said first and second spaced apart portions of said heater means exceeds a predetermined level, said temperature difference resulting from a difference in rates of heat transfer of said heat conductive member and said tip member; and
 means for sensing when said heat responsive means are engaged.

15. A combination according to claim 14 wherein said means for sensing when said heat responsive means are engaged is an electrical circuit comprising a source of electrical potential operatively connected to said heat responsive means for opening and closing said circuit and a current indicating means adapted for indicating electrical current in said circuit when said heat responsive means are engaged.

16. A combination according to claim 15 wherein in said sensor device said heat responsive means members are bimetallic members.

17. A combination according to claim 15 wherein in said sensor device said heater means within said chamber is an electrical resistive element and is operatively connected to said source of electrical potential.

18. A combination according to claim 17 wherein in said sensor device said heat conductive member is electrically conductive and is operatively connected to said electrical potential and to said electrical resistive element.

19. A combination according to claim 18 wherein in said sensor device said tip member is electrically conductive and is operatively connected to said source of electrical potential and said electrical resistive element.

* * * * *